United States Patent [19]

Partington et al.

[11] Patent Number: 4,552,850

[45] Date of Patent: Nov. 12, 1985

[54] GLASSES AND METHODS FOR MAKING THEM

[75] Inventors: Sally Partington, Bradfield, Nr. Manningtree; Steven F. Carter, Ipswich, both of England

[73] Assignee: British Telecommunications, London, England

[21] Appl. No.: 446,401

[22] Filed: Dec. 2, 1982

[30] Foreign Application Priority Data

Dec. 3, 1981 [GB] United Kingdom ............... 8136502

[51] Int. Cl.$^4$ ............................................. C03C 3/10
[52] U.S. Cl. ....................................... 501/37; 65/134; 501/53; 501/55; 501/903
[58] Field of Search ............. 501/37, 38, 903, 53, 501/55; 65/134

[56] References Cited

U.S. PATENT DOCUMENTS

| | | | |
|---|---|---|---|
| 4,179,300 | 12/1979 | Sagara | 501/55 |
| 4,265,667 | 5/1981 | Ikeda . | |
| 4,275,951 | 6/1981 | Bealer et al. | 501/37 |
| 4,367,012 | 1/1983 | Ikeda et al. | 501/37 |
| 4,445,754 | 5/1984 | Bealer et al. | 501/37 |
| 4,452,508 | 6/1984 | Bealer et al. | 501/37 |

FOREIGN PATENT DOCUMENTS

| | | | |
|---|---|---|---|
| 0000282A | 1/1979 | European Pat. Off. | 501/37 |
| 0018100 | 10/1980 | European Pat. Off. | 37/ |
| 55-60040 | 5/1980 | Japan | 501/37 |
| 2034300 | 3/1983 | United Kingdom | 501/37 |

OTHER PUBLICATIONS

Yoshiyagawa, M. et al., Optical Transmission Properties of Low Loss Large . . . J. Non-Crystalline Solids, 40, 489–497 (1980), Chemical Abstracts 93:209118j, vol. 93 (1980).

Dunn, A. G., et al. Near Infrared Optical Absorption of Iron (II) in Some . . . Physics and Chemistry of Glasses, vol. 19, No. 1, (1978).

*Primary Examiner*—Andrew H. Metz
*Assistant Examiner*—Terryence Chapman
*Attorney, Agent, or Firm*—Cushman, Darby & Cushman

[57] ABSTRACT

A glass suitable for use in optical fibre cores has a refractive index of 1.540–1.610, $Na_2O$ and $B_2O_3$ in a molar ratio of 1.05–2:1, 2–12 mole percent BaO, 40–63 mole percent $SiO_2$, and 1.5–15 mole percent $ZrO_2$, the proportion of $SiO_2$ and $ZrO_2$ together not exceeding 65 mole percent. The glass can be prepared in a highly reduced state by the use of CO and a redox buffering agent. The glass is especially suitable for the production of high numerical aperture wide cored fibres.

13 Claims, No Drawings

GLASSES AND METHODS FOR MAKING THEM

The present invention relates to a glass suitable for use in the cores of optical fibres, especially for use as core glasses in the production of step-index high numerical aperture (NA) optical fibres, most especially by the double crucible process. The present invention further relates to methods of making such compositions and to optical fibres containing them.

High NA optical fibres are particularly useful for short optical fibre links (e.g. of length less than 1 km) where efficient power launching is of considerable importance. Among such short links are data links between computers and ancillary equipment and also links in telephone exchanges.

In order to facilitate coupling to other system components such fibres may be required to have large core diameters of for example 175 μm and, moreover, to have an acceptable level of loss. As the optical fibres are principally intended to be utilised over relatively short links losses of up to 10 dB/km or in some cases more (e.g. up to 15 or 20 dB/km) are acceptable, although it is clearly desirable to reduce the loss as much as possible within the constraints.

The numerical aperture of a fibre is theoretically equal to $\sqrt{n_1^2 - n_2^2}$ where $n_1$ is the refractive index of the core and $n_2$ is the refractive index of the cladding. The amount of light coupled into an optical fibre, other things being equal, is usually proportional to the product of the square of the numerical aperture and the cross-sectional area of the fibre core.

In our European patent application No. 0018110A, we described, inter alia, core glasses suitable for use in optical fibres which had refractive indices in the range from 1.540 to 1.610, were not subject to devitrification or phase separation, and which contained the five components $Na_2O$ (soda or sodium oxide), $B_2O_3$ (boric oxide), BaO (baria or barium oxide), $SiO_2$ (silica or silicon dioxide), and $GeO_2$ (germania or germanium dioxide) and only small amounts of other components. Both barium oxide and germanium dioxide are highly refractive components in sodium borosilicate glasses, i.e. their presence raises the refractive index of the glass. In order to minimise loss in the eventual fibre, it was necessary to use intermediate reducing conditions in the production of these glasses, these conditions corresponding to a partial pressure of oxygen of about $10^{-5}$ atmospheres. More oxidising conditions than this led to increased loss through absorption by transition metal impurities such as copper while more reducing conditions (e.g. corresponding to a partial oxygen pressure of $10^{-13}$ atmospheres) led to a very high scatter loss from unknown causes.

The $Na_2O:B_2O_3$ molar ratio in these glasses was high (substantially in excess of 2:1).

The use of these glasses to produce fibres by the double crucible process was also described.

The use of $ZrO_2$ (zirconia or zirconium dioxide) as a highly refractive component in vitreous silica for optical fibres is known from our UK Pat. No. 1 368 093.

M Yoshiyagawa, Y Kaite, T Ikuma, and T Kishimoto, J Non-Crystalline Solids, 40, 489-497 (1980) refers to the use, alone or in combination, of a range of oxides in sodium borosilicate glasses for optical fibres. These oxides are MgO, CaO, SrO, BaO, ZnO, $Al_2O_3$, $La_2O_3$, $TiO_2$, $GeO_2$, and $ZrO_2$. No preference among these oxides is stated and detailed compositions are not specified.

In Chemical Abstract No 93:209118j (1980) and Japanese unexamined patent application No. 80 60040 there are described sodium borosilicate glasses containing barium oxide and zirconium dioxide but these have very high barium oxide contents and very high refractive indexes ranging from 1.59 to 1.65. The same document also discloses glasses containing substantial quantities of further components in combination and not in combination with BaO and $ZrO_2$. Oxides whose uses are suggested and exemplified are $Li_2O$, $K_2O$, $Rb_2O$, $Cs_2O$, MgO, CaO, SrO, ZnO, $Al_2O$, $La_2O_3$, $TiO_2$, and $GeO_2$.

In U.S. Pat. No. 4265667 (equivalent to French published patent specification No. 2 481 261) there are described various stable sodium borosilicate glasses containing BaO and $ZrO_2$. These have very high BaO contents, have refractive indexes in excess of 1.61, and contain further components, for example $Li_2O$, $K_2O$, $Rb_2O$, $Cs_2O$, MgO, CaO, SrO, ZnO, $Al_2O_3$, $La_2O_3$, $TiO_2$ and $GeO_2$.

In French patent application No. 2 438 018 (equivalent to UK patent application No. 2 034 300) there are disclosed sodium borosilicate glasses containing BaO and $ZrO_2$ which have refractive indexes of less than 1.540. There is additionally a disclosure of a glass of refractive index exceeding 1.61 similar to those described in Chemical Abstracts No 93: 209 118j and already referred to. In the said French patent application, the use is suggested and exemplified also of further components in combination with and not in combination with BaO and $ZrO_2$. Such components are $Li_2O$, $K_2O$, $Cs_2O$, $Tl_2O$, MgO, CaO, ZnO, PbO, ZnO, $Al_2O_3$, and $TiO_2$. The main concern of the French patent application is the production of cladding glasses where water resistance is a prime consideration.

The present invention is based on our surprising discovery that satisfactory glasses having refractive indexes in the range 1.540 to 1.610 (but having advantages over the similar glasses of European Pat. No. 0018110A) can be produced by the use as components of $Na_2O$, $B_2O_3$, BaO, $SiO_2$, and $ZrO_2$ with only minor quantities of other components, the components being used in proportions quite dissimilar from the glasses of the aforesaid prior art on BaO- and $ZrO_2$-containing sodium borosilicate glasses. From the aforesaid prior art on BaO- and $ZrO_2$-containing sodium borosilicate glasses it could not have been predicted that the glasses provided by the present invention would be satisfactory, since it is well known in this field that substantial variations of composition from known satisfactory compositions can affect stability of a glass and the optical losses in the glass. (In this respect, and generally, it may be noted that glasses which are apparently stable but have compositions close to unstable ones, frequently yield fibres having high loss.)

The present invention provides a glass suitable for use in the core of an optical fibre and having a composition such that it is not subject to devitrification or phase separation, which glass (I) has a refractive index in the range from 1.540 to 1.610 and (II) comprises the five components $Na_2O$, $B_2O_3$, BaO, $SiO_2$, and a highly refractive component other than BaO and not more than 5 weight percent of any further components taken together relative to the said five components taken together, the proportion of BaO being in the range from 2 to 12 mole percent relative to the said five components taken together and the proportion of $SiO_2$ being in the range from 40 to 63 mole percent relative to the said five components taken together, characterised in that (i) the said highly refractive component is $ZrO_2$ in a proportion lying in the range from 1.5 to 15 mole percent relative to the said five components taken together, the proportion of $SiO_2$ and $ZrO_2$ taken together being not more than 65 mole percent relative to the said five components taken together, and (ii) the $Na_2O:B_2O_3$ molar ratio is in the range from 1.05:1 to 2:1.

An advantage of these glasses over the aforesaid glasses of European patent application No. 0018110A is that they do not display scatter loss when highly reduced. This permits the best possible suppression of absorption loss due to transition metal ions such as copper by a convenient process.

A further advantage is that the amount of $ZrO_2$ required to achieve a given refractive index is less than the amount of $GeO_2$, so that the purity specification for the $ZrO_2$ need not be so stringent for a given maximum prescribed level of interfering impurities. There are additionally overall cost advantages to the use of $ZrO_2$ of the requisite purity in the requisite quantities. Cost advantages are especially important for large diameter cores because of the amount of material involved.

The glasses according to the present invention are generally more viscous when molten than the aforesaid glasses of European patent application No. 0018110A, which offers interesting new possibilities. In particular, it offers a way of avoiding or reducing the problem that can be encountered with these prior art glasses, namely the excessively rapid pulling of core glass compared with the cladding glass in the double crucible process.

On the various compositional features of the glass according to the present inventon further observations may be made as follows, without explicit comparison with the prior art.

The limit of 5 weight percent on further components reflects the fact that (apart from possibly redox buffering agents) other components can usually be avoided. This is good because, firstly, the use of numerous components raises the possibly expensive question of the purity specification with each one and, secondly it simplifies production of the glass. Apart from redox buffering agents, a minor component which we presently think may prove attractive is $Al_2O_3$, perhaps at a level of 1 to 3 weight percent.

The lower limit on the proportion of $ZrO_2$ ensures that at least a part of the refractive index increase is due to zirconia. With BaO alone, it is difficult to achieve refractive indices much in excess of 1.55 without the glass becoming unstable. However, even with the use of $ZrO_2$ a molar proportion in excess of 15 percent tends to lead to instability (albeit for a much higher refractive index).

The range for molar ratio $Na_2O:B_2O_3$ is especially suitable in achieving a good balance between glass stability (favoured by $Na_2O$) and fibre-forming performance in the double crucible process (favoured by $B_2O_3$).

Perferably, the proportion of $ZrO_2$ in the present invention is in the range from 3 to 10 mole percent. Preferably, the proportion of BaO is in the range from 4 to 8 mole percent.

The molar ratio $Na_2O:B_2O_3$ is preferably in the range 1.10 to 1.50, especially from 1.10 to 1.40.

The present invention affords glasses with especially good viscosity properties for the range of refractive index 1.550 to 1.590.

Preferably the proportion of $Na_2O$ lies in the range from 15 to 25 mole percent and that of $B_2O_3$ lies in the range from 10 to 20 mole percent, both proportions being relative to the five components ($Na_2O$, $B_2O_3$, BaO, $SiO_2$, and $ZrO_2$) taken together. Preferably, the proportion of $SiO_2$ and $ZrO_2$ taken together is at least 50 mole percent relative to the said five components taken together, and more preferably at least 55 mole percent.

It will be appreciated that the glass according to the present invention can be formed in any appropriate manner, and that formation as a melt which can be subsequently converted to a solid glass for storage is especially convenient.

The present invention further provides a method of preparing the glass provided by the invention which comprises the steps of (a) preparing a melt including from 0.01 to 1 weight percent of a redox buffering agent or of one or more redox buffering agents taken together relative to the said five components taken together, and (b) passing carbon monoxide through the melt.

We find arsenic trioxide, $As_2O_3$, to be a convenient redox buffering agent, but other oxides, for example antimony oxide ($Sb_2O_3$), can also be used. Preferably, the amount employed lies in the range 0.05 to 0.2 weight percent. The function of these agents is described in general terms in European patent application No. 0018110A and in UK Pat. No. 1 507 711 referred to therein.

In general, melt composition and final glass composition are practically the same, and any deviations can be allowed for after simple trial and error. We have observed minor deviations due to reduction of $As_2O_3$ to volatile As during step (b).

Carbon monoxide is conveniently used in the form of a mixture with carbon dioxide, said mixture however preferably not containing less than 10 percent by volume of carbon monoxide.

Depending on the transition metal contaminants in the melt, it may be desirable to pass oxygen through the melt (either pure or in admixture with other gases) prior to step (b).

The present invention also provides an optical fibre comprising a core comprising the glass provided by the present invention and a cladding comprising a sodium borosilicate glass of lower refractive index.

The sodium borosilicate glass used for the cladding may include components other than $Na_2O$, $B_2O_3$, and $SiO_2$. Preferably, only small quantities of such further components are used, e.g. $Al_2O_3$ at a level of 1–2 mole percent relative to $Na_2O$, $B_2O_3$, $SiO_2$, and $Al_2O_3$ taken together may afford advantages of durability and water resistance. Preferably, the glass is in a highly reduced state.

Preferred fibres in accordance with the present invention are made by the double crucible process. Convenient large core high NA fibres in accordance with the present invention have a core diameter in the range from 90 to 220 µm. The outer diameter of the cladding is normally at least 25 µm greater than the core diameter and is conveniently in the range from 115 µm to 270 µm.

The present invention will now be further illustrated by means of Examples 1 to 12 and Comparative Examples C1 to C5 (not in accordance with the invention).

Each of these Examples and Comparative Examples illustrates a core glass material (or an attempted core glass material). The compositions and observed properties are given in Tables 1 and 2 respectively.

TABLE 1

Glass Compositions

| Example No | mole percentages | | | | |
|---|---|---|---|---|---|
| | $Na_2O$ | $B_2O_3$ | BaO | $ZrO_2$ | $SiO_2$ |
| 1 | 20 | 14.5 | 4 | 2 | 59.5 |
| 2 | 20 | 14.5 | 4 | 3.5 | 58 |
| 3 | 20 | 14.5 | 4 | 5 | 56.5 |
| 4 | 20 | 14.5 | 4 | 10 | 51.5 |
| 5 | 20 | 14.5 | 4 | 12.5 | 49 |
| 6 | 20 | 14.5 | 4 | 15 | 46.5 |
| C1 | 20 | 14.5 | 4 | 16 | 45.5 |
| C2 | 20 | 14.5 | 4 | 17.5 | 44 |
| C3 | 20 | 16 | 4 | 17.5 | 42.5 |
| 7 | 20 | 18 | 4 | 8 | 50 |
| 8 | 20 | 18 | 4 | 15 | 43 |
| 9 | 19 | 15 | 8 | 3 | 55 |
| 10 | 19 | 15 | 8 | 5.16 | 52.84 |
| 11 | 19 | 15 | 8 | 7 | 51 |
| 12 | 19 | 15 | 8 | 10 | 48 |
| | $Na_2O$ | $B_2O_3$ | BaO | $GeO_2$ | $SiO_2$ |
| C4 | 20 | 8.3 | 11.7 | 12 | 48 |
| C5 | 20 | 8.3 | 11.7 | 25 | 35 |

TABLE 2

| Example No | glass properties | | | | | |
|---|---|---|---|---|---|---|
| | $\rho$ in g cm$^{-3}$ | $\alpha$ in $10^{-7}$ °C.$^{-1}$ | $n_D$ | $T_g$ in °C. | SP in °C. | Stability |
| 1 | 2.73 | 81.9 | 1.5436 | 570 | 635 | Yes |
| 2 | 2.76 | 81 | 1.5509 | 574 | 640 | Yes |
| 3 | 2.79 | 74.8 | 1.5577 | 587 | 660 | Yes |
| 4 | 2.89 | 76.6 | 1.5815 | 592 | 670 | Yes |
| 5 | 2.94 | 75.9 | 1.5915 | 592 | 663 | Yes |
| 6 | 2.99 | 72.5 | 1.6028 | 615 | 672 | Yes |
| C1 | — | — | — | — | — | No |
| C2 | — | — | — | — | — | No |
| C3 | — | — | — | — | — | No |
| 7 | 2.86 | 86.6 | 1.5750 | 575 | 645 | Yes |
| 8 | 2.97 | 82.9 | 1.6017 | 598 | 658 | Yes |
| 9 | 2.90 | 81.1 | 1.5615 | 578 | 620 | Yes |
| 10 | 2.94 | 79.7 | 1.5714 | 575 | 645 | Yes |
| 11 | 2.98 | 82.05 | 1.5794 | 595 | 648 | Yes |
| 12 | 3.05 | 78.1 | 1.5938 | 593 | 643 | Yes |
| C4 | 3.11 | — | 1.5688 | 523 | 565 | Yes |
| C5 | 3.34 | — | 1.5916 | 505 | 545 | Yes |

$\rho$ = density, $\alpha$ = linear coefficient of expansion, $n_D$ = refractive index (Na D line), $T_g$ = glass temperature, SP = dilatometric softening point The preparative procedure for Examples 1 to 12 and Comparative Examples C1 to C3 was as follows: The starting materials were high-purity $Na_2CO_3$, $Na_2B_4O_7$, $BaCO_3$, $ZrO_2$, $SiO_2$, and $As_2O_3$ powders. The powders were mixed together in the proportions appropriate to the desired glass composition, the $As_2O_3$ being used at a level of 0.1 weight percent relative to the other components taken together. The mixture was then introduced gradually into a silica crucible at 1100° C. where it melted. The melt was left to react for a further hour or so and the temperature was raised to 1150° to 1200° C. and pure dry carbon dioxide was passed over the top of the melt at 2 liter/min, this flow being maintained to the end of the preparation. Gases were bubbled through the melt in the following order: pure dry carbon dioxide for 2 hours; pure dry oxygen for ½ hour; and a mixture of 18 volume percent carbon monoxide and 82 volume percent carbon dioxide for 1½ hours. In each case the flow rate was 500 ml/min. Bubbling was then discontinued (the flow of carbon dioxide over the melt being maintained) and the melt was heated to 1250° C. for 18 hours to remove bubbles. The melt was then cooled to 850°–900° C., and the glass was removed as rods and stored.

The preparative procedure for Comparative Examples C4 and C5 was in accordance with the invention of European patent application No. 0018110A and in particular the glass was in an intermediate redox state (corresponding to a partial oxygen pressure of about $10^{-5}$ atmospheres) achieved with the use of pure dry carbon dioxide instead of the carbon monoxide/carbon dioxide mixture (which latter corresponded to a partial oxygen pressure of about $10^{-13}$ atmospheres).

The three series of Examples 1 to 6, 7 to 8, and 9 to 12 respectively show how, if the molar proportions of $Na_2O$, $B_2O_3$, and BaO are fixed, the refractive index varies as one changes the relative amounts of $ZrO_2$ and $SiO_2$ constituting the balance of the composition.

The glass of Example 12 was found to corrode the silica crucible in which it was being melted, but this problem is one which may be overcome by the use of an alternative material for the crucible.

Comparative Examples C1 to C3 illustrate the instability (due to crystallisation) that arises for high $ZrO_2$ concentrations. Comparative Examples C4 and C5 illustrate the lower glass and softening temperatures (and hence viscosities) of the prior art glasses in accordance with European patent application No. 0018110A.

From glasses in accordance with the present invention, fibres were prepared having core diameters of 175 μm and outer cladding diameters of 200 μm. The cladding glasses were prepared with the use of $As_2O_3$ as a redox buffering agent and with the use of a carbon monoxide/carbon dioxide mixture to achieve a highly reduced state.

An optical fibre was prepared from the glass of Example 2 by the double crucible process. The drawing (i.e. nozzle) temperature was approximately 850° C. The cladding glass had the composition 20 mole % $Na_2O$, 17.5 mole % $B_2O_3$, 61 mole % $SiO_2$, and 1.5 mole % $Al_2O_3$ and had a refractive index $n_D$ of 1.5185. The numerical aperture of the fibre was 0.32 and the fibre had a loss of 7.3 dB/km at 850 nm.

An optical fibre was prepared also from the glass of Example 7. The drawing temperature was in this case about 900° C. because of the higher viscosity of the glass. The cladding glass had the composition 20 mole % $Na_2O$, 17.5 mole % $B_2O_3$, 59 mole % $SiO_2$, 2 mole % MgO, and 1.5 mole % $Al_2O_3$ and a refractive index of 1.5183. The numerical aperture was 0.41, and the fibre had a loss at 850 nm of 10.9 dB/km.

We claim:

1. A glass suitable for use in the core of an optical fibre and having a composition such that it is not subject to devitrification or phase separation, which glass
   has a refractive index in the range from 1.540 to 1.610 and
   comprises the five components $Na_2O$, $B_2O_3$, BaO, $SiO_2$, and $ZrO_2$ and not more than 5 weight percent of any further components taken together relative to the said five components taken together,
   the molar ratio $Na_2O:B_2O_3$ being in the range from 1.1:1 to 1.5:1,
   the proportion of BaO being in the range from 2 to 12 mole percent relative to the said five components taken together, the proportion of $SiO_2$ being in the range from 40 to 63 mole percent relative to the said five components taken together, the proportion of $ZrO_2$ being in the range from 1.5 to 15 mole percent relative to the said five components taken together, and the proportion of $SiO_2$ and $ZrO_2$ taken together being not more than 65 mole percent relative to the said five components taken together.

2. A glass according to claim 1, wherein the proportion of $ZrO_2$ is in the range from 3 to 10 mole percent.

3. A glass according to claim 1, wherein the proportion of BaO is in the range from 4 to 10 mole percent.

4. A glass according to any of claims 1 to 3, wherein the proportion of $Na_2O$ is in the range from 15 to 25 mole percent relative to the said five components taken together and the proportion of $B_2O_3$ is in the range from 10 to 20 mole percent relative to the said five components taken together.

5. A glass according to claim 4, wherein the proportion of $SiO_2$ and $ZrO_2$ taken together is in the range from 55 to 65 mole percent relative to the said five components taken together.

6. A glass according to any of claims 1 to 3, wherein the proportion of $SiO_2$ and $ZrO_2$ taken together is in the range from 55 to 65 mole percent relative to the said five components taken together.

7. A glass according to any of claims 1 to 3, which has a refractive index in the range from 1.550 to 1.590.

8. A glass according to any of claims 1 to 3, which is in a highly reduced state.

9. A method of preparing a glass suitable for use in the core of an optical fibre and having a composition such that it is not subject to devitrification or phase separation, which glass has a refractive index in the range from 1.540 to 1.610 and comprises the five components $Na_2O$, $B_2O_3$, BaO, $SiO_2$, and $ZrO_2$ and not more than 5 weight percent of any further components taken together relative to the said five components taken together, the molar ratio $Na_2O:B_2O_3$ being in the range from 1.1:1 to 1.5:1, the proportion of BaO being in the range from 2 to 12 mole percent relative to the said five components taken together, the proportion of $SiO_2$ being in the range from 40 to 63 mole percent relative to the said five components taken together, the proportion of $ZrO_2$ being in the range from 1.5 to 15 mole percent relative to the said five components taken together, and the proportion of $SiO_2$ and $ZrO_2$ taken together being not more than 65 mole percent relative to the said five components taken together, which method comprises the steps of (a) preparing a melt including from 0.01 to 1 weight percent of a redox buffering agent or of one or more redox buffering agents taken together relative to the said five components taken together, and (b) passing carbon monoxide through the melt.

10. A method according to claim 9, wherein the redox buffering agent is $As_2O_3$.

11. A method according to claim 9, wherein the melt of (a) includes from 0.05 to 0.2 weight percent of redox buffering agent.

12. A method according to claim 9, wherein step (b) is performed with a mixture of carbon monoxide and carbon dioxide containing at least 10 mole percent of the former.

13. A method according to any of claims 9 to 12, wherein oxygen is passed through the melt between step (a) and step (b).

* * * * *